May 5, 1931.  F. SCHAEFER  1,804,118

BRAKE HANGER SUPPORT

Filed Jan. 5, 1927

INVENTOR
Frederic Schaefer,
by Winter Brown & Critchlow,
his attorneys.

Patented May 5, 1931

1,804,118

UNITED STATES PATENT OFFICE

FREDERIC SCHAEFER, OF PITTSBURGH, PENNSYLVANIA

BRAKE HANGER SUPPORT

Application filed January 5, 1927. Serial No. 159,075.

The invention relates to attachments of brake hangers to the side frames of railway car trucks.

In supporting a brake beam by brake beam hangers which are suspended from truck frames there are four points of wear which, as service continues, result in lowering the brake beam below its original and desired position. These points of wear are the upper and lower yokes or pins of the hangers, the bearing portions of the brake shoe heads engaged by the lower yokes of the hangers, and the bearing portion of the side frames engaged by the upper yokes of the hangers. The hangers and brake shoe heads are comparatively small parts which may readily be replaced when worn beyond the maximum permissible limit, but the side frames of a truck are large and expensive members which cannot be economically replaced merely because of the wear of their hanger supporting portion.

The object of this invention is to provide a truck frame support for a brake beam, so formed that a hanger may be readily attached to or removed from the truck, and having a readily replaceable wear-resisting member forming a bearing for the upper yoke or pin of a hanger.

Figure 1:
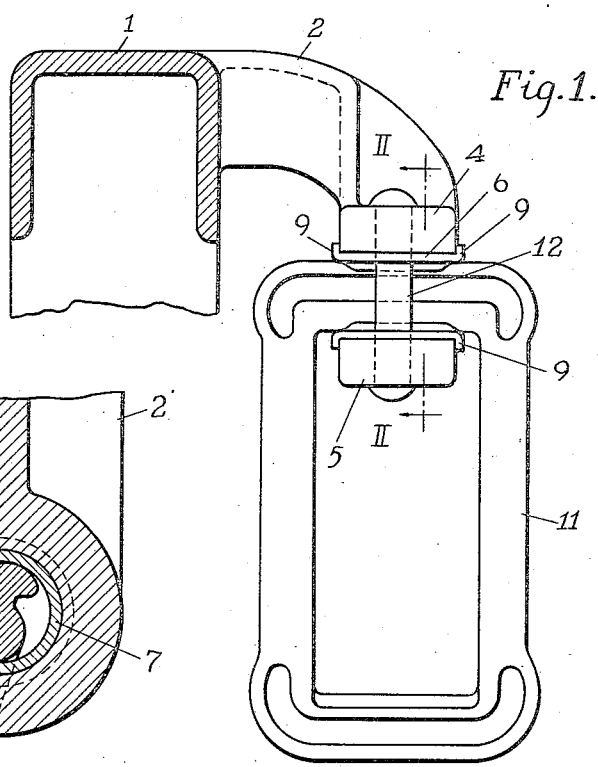
Figure 2:
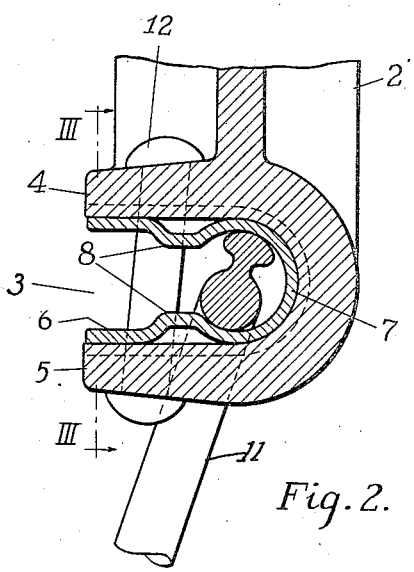
Figure 4:
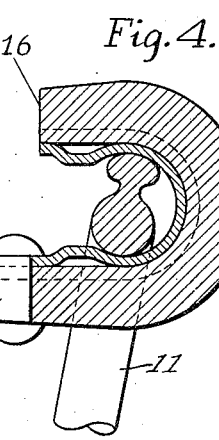
Figure 3:
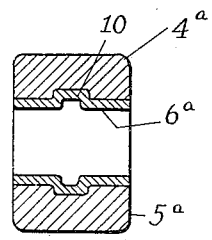

The invention is illustrated in the accompanying drawings of which Fig. 1 is a transverse vertical section of the upper cord of a truck frame having a brake hanger supporting bracket attached to it which is shown in elevation together with a brake hanger; Fig. 2 a vertical sectional view of the brake hanger support, the plane of view being indicated by the line II—II, Fig. 1; Fig. 3 a vertical sectional view taken on the line III—III, Fig. 2, showing a modification of construction of a liner; Fig. 4 a view corresponding to Fig. 2 showing a modification of construction of a supporting bracket and liner; and Fig. 5 a left end view of the construction shown in Fig. 4.

According to this invention a truck frame is provided with a bracket having an open-ended horizontally disposed slot to receive the upper yoke of a continuous or loop brake hanger, or the connecting pin of a U-shaped hanger. Within the slot formed by the bracket there is arranged a removable liner of wear-resisting metal which conforms to the wall of the slot, and, like the slot is open-ended to receive a brake hanger. Intermediate of its ends the liner is preferably provided with inwardly extending portions which permit the application of a detached liner to a brake hanger having an upper yoke which is elongate in transverse cross section, and which serve to lock the hanger in operative position when the liner is placed in a bracket slot. Provision is made for attaching the liner to the bracket in such a manner that it may be removed when worn. While the liner may be formed of various wear-resisting metals, it is preferably formed of a hard or hardened steel plate which is pressed, forged or otherwise formed into the required shape.

Having reference to the illustrative embodiment of the invention, a truck frame 1 is shown as being provided at its side with a laterally extending bracket 2, the lower end of which is provided with a horizontally disposed slot 3 formed between upper and lower projections 4 and 5 of the bracket. Within the slot there is arranged a liner 6 of wear-resisting metal shaped to conform to the walls of the slot. At its inner end 7 the liner is of general cylindrical shape to form a bearing for the upper yoke or pin of a brake hanger, and intermediate of its ends the liner is provided with inwardly pressed projections 8 for narrowing the slot for the purpose previously explained. As shown in Figs. 1 and 2, the edges of the liner may be provided with flanges 9 arranged adjacent to the side walls of bracket projections 4 and 5 for holding the liner against lateral displacement, or as shown in Fig. 3, a liner 6a may be provided intermediate of its sides with an outwardly extending detent 10 adapted to be received by a corresponding recess formed in bracket projections 4a and 5a.

Within the slot formed by the bracket and liner there is shown a brake hanger 11 of the loop or closed link type. The upper and lower yokes or transverse arms of the hanger are elongate in transverse section, and are preferably of the asymmetric I-beam form disclosed and claimed in my Patent No. 1,470,121. The brake hanger is indicated in Fig. 2 in its operative beam-supporting position in which it is held by the inwardly extending liner projections 8.

Figure 5:
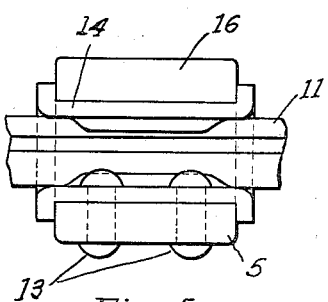

As shown in Figs. 1 and 2, the liner may be attached to the bracket by a pin, preferably in the form of a rivet 12, which extends through suitable openings formed in both bracket projections 4 and 5 and in the both legs of liner 6. However, as illustrated in Figs. 4 and 5, it is preferred to attach the liner to the bracket by rivets 13 extending through but one leg of a liner 14, and, for ease in driving the rivets, lower slot-forming projection 15 extends beyond upper slot-forming projection 16.

According to the provisions of the patent statutes, I have explained the principle and operation of my invention, and have illustrated and described what I now consider to represent its best embodiments. However, I desire to have it understood that, within the scope of the appended claims, the invention may be practiced otherwise than as specifically shown and described.

I claim as my invention:

1. The combination of a truck frame for railway cars provided with a bracket having an open-ended slot to receive a brake hanger, a U-shaped liner of wear-resisting metal arranged in said slot with its base adjacent to the inner end of the slot, said liner being provided with inwardly extending portions contracting the slot intermediate of its ends, a brake hanger having its upper portion arranged in said slot and bearing upon said liner, and means for attaching the liner to the bracket.

2. The combination of a truck frame for railway cars provided with a bracket having an open-ended slot for receiving a brake hanger and having a portion projecting beyond the end of the slot, a liner of wear-resisting metal arranged in said slot and having an end extending beyond the slot adjacent to said projecting portion, said end of the liner being attached to said projecting portion of the bracket, and a brake hanger arranged in said slot and bearing upon said liner.

3. The combination of a truck frame for railway cars provided with a bracket having an open-ended slot for receiving a brake hanger and having a portion projecting beyond the end of the slot, a U-shaped liner of wear-resisting metal arranged in said slot and having an end extending beyond the slot adjacent to said projecting portion, said end of the liner being riveted to said projecting portion of the bracket, and a brake hanger arranged in said slot and bearing upon said liner.

4. The combination of a truck frame for railway cars provided with a bracket having an open-ended slot to receive a brake hanger, a U-shaped liner of wear-resisting material arranged in said slot having an inner end forming a bearing for a brake hanger and having an inwardly extending portion intermediate of its ends for contracting the opening between its sides, a brake hanger having an upper portion of elongate transverse cross-section arranged in said slot and bearing upon the inner end of said liner, said hanger when in operative position being retained in said slot by said inwardly-extending portion of said liner and means for attaching the liner to the bracket.

5. The combination of a truck frame for railway cars provided with a bracket having an open-ended slot to receive a brake hanger, a U-shaped liner of wear-resisting material arranged in said slot having an inner end forming a bearing for a brake hanger and being slidable in said slot for applying it to and removing it from the bracket, the side edges of said liner being provided with vertically disposed flanges overlying the sides of the bracket, and means for attaching the liner to the bracket.

6. The combination of a truck frame for railway cars provided with a bracket having an open-ended slot to receive a brake hanger, an inner face of the bracket being provided with a groove, and a U-shaped liner of wear-resisting material arranged in said slot and having an inner end forming a bearing for a brake hanger, a leg of said liner being provided with a rib lying in said bracket groove.

7. In a brake beam hanger bracket, members forming an open-ended and open-sided recess, and a renewable bushing seated in said recess, movable through the open side thereof and having flanged ends engaging the outer faces of said members at the ends of said recess.

8. In a brake beam hanger bracket, members forming an open-ended and open-sided recess, a renewable bushing seated in said recess, movable through the open side thereof and having flanged ends engaging the outer faces of said members at the ends of said recess, and means for preventing movement of said bushing through the open side of said recess.

9. In combination, a brake beam hanger bracket having an open-ended and open-sided recess, an open-sided bushing in said recess having a seat portion and sides which approach each other between said seat portion and the open side to form a restricted passageway to and from said seat, and a hanger having a supported portion adapted to be moved through said restricted passageway, when turned to a predetermined angle, and to be held against such movement when in normal functioning position.

10. In combination, a brake beam hanger bracket having an open-ended and open-sided recess, an open-sided bushing in said recess having a seat portion and sides which approach each other between said seat portion and the open side to form a restricted passageway to and from said seat, and a hanger having a supported portion of ovoid cross section, the longer axis of which section extends transversely of said passageway when said hanger is functioning to support a brake beam.

In testimony whereof, I sign my name.

FREDERIC SCHAEFER.